US010678092B2

(12) United States Patent
Ryoo et al.

(10) Patent No.: US 10,678,092 B2
(45) Date of Patent: Jun. 9, 2020

(54) DISPLAY BACKLIGHT HEADROOM CONTROL SYSTEMS AND METHODS

(71) Applicant: Apple Inc., Cupertino, CA (US)

(72) Inventors: Ji Yeoul Ryoo, Cupertino, CA (US); Asif Hussain, San Jose, CA (US); Jingdong Chen, San Jose, CA (US); Mohammad J. Navabi-Shirazi, San Jose, CA (US); Yanhui Xie, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 314 days.

(21) Appl. No.: 15/711,932

(22) Filed: Sep. 21, 2017

(65) Prior Publication Data

US 2018/0373094 A1   Dec. 27, 2018

Related U.S. Application Data

(60) Provisional application No. 62/524,377, filed on Jun. 23, 2017.

(51) Int. Cl.
*G06F 5/00* (2006.01)
*G02F 1/13357* (2006.01)
(Continued)

(52) U.S. Cl.
CPC ..... *G02F 1/133603* (2013.01); *G09G 3/3406* (2013.01); *G09G 3/3696* (2013.01);
(Continued)

(58) Field of Classification Search
CPC ............ G09G 3/22; G09G 2300/0842; G09G 2320/043; G09G 3/3233; G09G 3/29;
(Continued)

(56) References Cited

U.S. PATENT DOCUMENTS 7,777,704 B2   8/2010   S et al.
8,049,439 B2  11/2011   Zhao et al.
(Continued)

OTHER PUBLICATIONS

International Search Report and Written Opinion from PCT/US2018/028026, dated Jul. 4, 2018, 15 pages.

*Primary Examiner* — Minh D A
(74) *Attorney, Agent, or Firm* — Jaffery Watson Mendonsa & Hamilton LLP

(57) ABSTRACT

Aspects of the subject technology relate to display circuitry such as backlight control circuitry for operating parallel strings of light-emitting diodes (LEDs). A voltage supply circuit of the backlight control circuitry provides a common supply voltage to the strings of LEDs. Headroom control circuitry samples a residual voltage at the end of each string, determines a minimum of the residual voltages, and provides feedback, based on the determined minimum voltage, to the voltage supply circuit. A headroom control feedback loop may be provided including sampling lines coupled to the second end of each string of LEDs for sampling a residual voltage of each string. Headroom control circuitry may modify the supply voltage based on the minimum residual voltage. Sample-and-hold circuitry may be provided that holds the sampled residual voltages until the voltage supply circuit is ready for an update.

26 Claims, 4 Drawing Sheets

(51) Int. Cl.
*G09G 3/34* (2006.01)
*G09G 3/36* (2006.01)
*H05B 45/00* (2020.01)
*H05B 45/37* (2020.01)
*H05B 45/46* (2020.01)
*H05B 47/10* (2020.01)
*G02F 1/1335* (2006.01)
*G06F 3/041* (2006.01)

(52) U.S. Cl.
CPC ............ *H05B 45/00* (2020.01); *H05B 45/37* (2020.01); *H05B 45/46* (2020.01); *H05B 47/10* (2020.01); *G02F 1/133528* (2013.01); *G06F 3/0412* (2013.01)

(58) Field of Classification Search
CPC ............... G09G 3/3216; G09G 3/3266; G09G 2330/021; G09G 3/296; G09G 3/2927; G09G 2310/066; G09G 3/294; G09G 3/3688; G09G 3/3648; G09G 2310/027; G09G 5/006; G09G 2300/0861; G09G 2320/0233; H01J 31/127; H01J 11/12; H05B 33/08; Y02B 20/325

See application file for complete search history.

(56) References Cited

U.S. PATENT DOCUMENTS

| | | | |
|---|---|---|---|
| 2006/0186830 A1* | 8/2006 | Shami | H02M 3/156 315/291 |
| 2009/0273288 A1 | 11/2009 | Zhao et al. | |
| 2012/0081016 A1 | 4/2012 | Wu et al. | |
| 2018/0160516 A1 | 6/2018 | Kwak et al. | |
| 2018/0373094 A1* | 12/2018 | Ryoo | G09G 3/3696 |

* cited by examiner

DISPLAY BACKLIGHT HEADROOM CONTROL SYSTEMS AND METHODS

CROSS-REFERENCE TO RELATED APPLICATIONS

The present application claims the benefit of U.S. Provisional Patent Application Ser. No. 62/524,377, entitled "DISPLAY BACKLIGHT HEADROOM CONTROL SYSTEMS AND METHODS," filed on Jun. 23, 2017, which is hereby incorporated by reference in its entirety for all purposes.

TECHNICAL FIELD

The present description relates generally to electronic devices with displays, and more particularly, but not exclusively, to electronic devices with displays having backlights and headroom control circuitry.

BACKGROUND

Electronic devices such as computers, media players, cellular telephones, set-top boxes, and other electronic equipment are often provided with displays for displaying visual information. Displays such as organic light-emitting diode (OLED) displays and liquid crystal displays (LCDs) typically include an array of display pixels arranged in pixel rows and pixel columns. Liquid crystal displays commonly include a backlight unit and a liquid crystal display unit with individually controllable liquid crystal display pixels.

The backlight unit commonly includes one or more light-emitting diodes (LEDs) that generate light that exits the backlight toward the liquid crystal display unit. The liquid crystal display pixels are individually operable to control passage of light from the backlight unit through that pixel to display content such as text, images, video, or other content on the display.

Backlight unit operation is a common source of power dissipation in electronic device displays, which can be undesirable, particularly in portable devices that use batteries for power storage.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
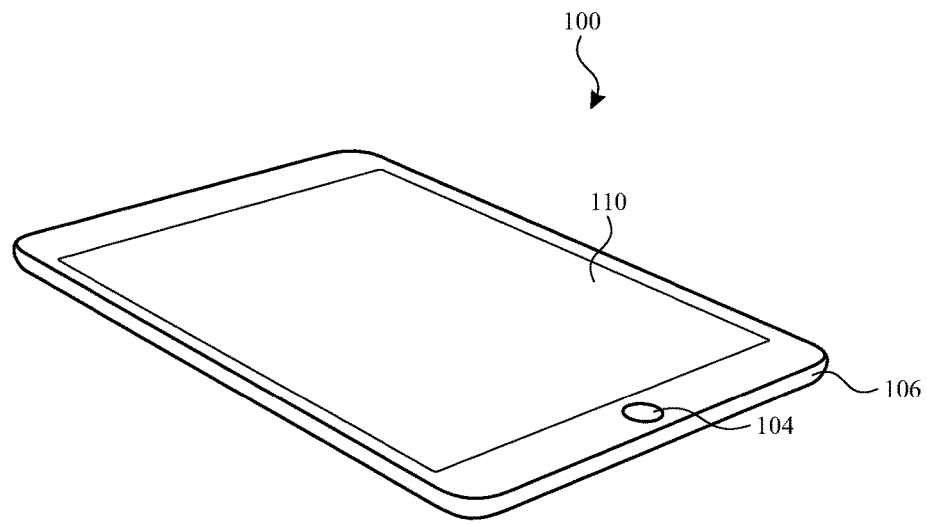
FIG. 1 illustrates a perspective view of an example electronic device having a display in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides electronic devices such as cellular telephones, media players, computers, set-top boxes, wireless access points, and other electronic equipment that may include light-emitting-diodes (LEDs) and associated control circuitry. LEDs may be included in displays, keyboards, flash devices, or other components for electronic devices. Various examples are described herein in connection with LED control in connection with display backlights. However, it should be appreciated that the LED control systems and methods described herein can be applied to other components or devices with LEDs. Displays may be used to present visual information and status data and/or may be used to gather user input data. A display may include an array of display pixels. Each display pixel may include one or more colored subpixels for displaying color images.

Each display pixel may include a layer of liquid crystals disposed between a pair of electrodes operable to control the orientation of the liquid crystals. Controlling the orientation of the liquid crystals controls the polarization of backlight generated by a backlight unit. This polarization control, in combination with polarizers on opposing sides of the liquid crystal layer, allows light passing into the pixel to be manipulated to selectively block the light or allow the light to pass through the pixel.

The backlight unit may include one or more strings of light-emitting diodes that generate the backlight for the display. The strings of light-emitting diodes may be arranged along one or more edges of a light guide plate that distributes backlight generated by the strings to the LCD unit, or may be arranged to form a two-dimensional grid of LEDs.

In some electronic device displays the backlight unit generates a constant amount of light for the display pixels and the amount of light that passes through each pixel is solely controlled by the operation of the liquid crystal display pixels. In other electronic device displays, the amount of light generated by the backlight is dynamically controlled, based on the content to be displayed on the display. In some devices with dynamic backlight control, individual backlight LEDs or groups of backlight LEDs are separately controlled to allow local dimming or brightening of the display to enhance the contrast generated by the LCD pixels.

Display control circuitry coupled to the array of display pixels and to the backlight unit typically receives data for display from system control circuitry of the electronic device and, based on the data for display, generates and provides control signals for the array of display pixels and for the backlight unit. The control signals for the backlight unit can include reference voltages for operating current drivers for LEDs (or strings of LEDs) that receive a common supply voltage.

Dynamic global and/or local dimming of the backlight can reduce power consumption by the display, since the supply voltage to the LEDs can be reduced for reduced brightness display frames. This can be particularly beneficial in portable devices that use batteries for power storage. However, even with local dimming, in current devices, the supply voltage for the backlight is provided with a headroom voltage that ensures that there is sufficient power available for operation of all LEDs. If a portion of this headroom voltage goes unused, undesirable power dissipation by the backlight can occur. In accordance with certain aspects of the subject disclosure, systems and methods are provided herein that include headroom control circuitry for display backlight units. Headroom control circuitry can reduce the headroom voltage for the backlight and provide a corresponding reduction in power consumption by the display.

Backlight control circuitry in the backlight unit may include voltage supply circuitry that provides a common supply voltage, at a first end, to multiple LED strings. The brightness of the LEDs in each string may be controlled by a current driver circuit for that string. The voltage drop, from the supply voltage, across each string can vary relative to other strings and/or over time (e.g., with increasing time from powering on the display and/or from display frame to display frame) because the current driver circuits can operate each string with a different current, because of variations in intrinsic LED characteristics, because of changes in temperature within the backlight unit, and/or other variable factors. Accordingly, a different residual voltage can remain on each string, which may be dissipated as heat, thereby wasting energy. In order ensure sufficient voltage for all strings, the supply voltage may be sufficiently high to leave a desired headroom voltage as the residual. Headroom control circuitry, as described in further detail hereinafter, is provided to provide sufficient, but minimal or reduced headroom voltage to help ensure proper operation of the backlight unit while reducing energy loss and usage.

An illustrative electronic device of the type that may be provided with a display is shown in FIG. 1. In the example of FIG. 1, device 100 has been implemented using a housing that is sufficiently small to be portable and carried by a user (e.g., device 100 of FIG. 1 may be a handheld electronic device such as a tablet computer or a cellular telephone). As shown in FIG. 1, device 100 may include a display such as display 110 mounted on the front of housing 106. Display 110 may be substantially filled with active display pixels or may have an active portion and an inactive portion. Display 110 may have openings (e.g., openings in the inactive or active portions of display 110) such as an opening to accommodate button 104 and/or other openings such as an opening to accommodate a speaker, a light source, or a camera.

Display 110 may be a touch screen that incorporates capacitive touch electrodes or other touch sensor components or may be a display that is not touch-sensitive. Display 110 may include display pixels formed from light-emitting diodes (LEDs), organic light-emitting diodes (OLEDs), plasma cells, electrophoretic display elements, electrowetting display elements, liquid crystal display (LCD) components, or other suitable display pixel structures. Arrangements in which display 110 is formed using LCD pixels and LED backlights are sometimes described herein as an example. This is, however, merely illustrative. In various implementations, any suitable type of display technology may be used in forming display 110 if desired.

Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a somewhat smaller portable device such as a wrist-watch device, a pendant device, or other wearable or miniature device, a media player, a gaming device, a navigation device, a computer monitor, a television, or other electronic equipment.

For example, in some implementations, housing 106 may be formed using a unibody configuration in which some or all of housing 106 is machined or molded as a single structure or may be formed using multiple structures (e.g., an internal frame structure, one or more structures that form exterior housing surfaces, etc.). Although housing 106 of FIG. 1 is shown as a single structure, housing 106 may have multiple parts. For example, housing 106 may have upper portion and lower portion coupled to the upper portion using a hinge that allows the upper portion to rotate about a rotational axis relative to the lower portion. A keyboard such as a QWERTY keyboard and a touch pad may be mounted in the lower housing portion, in some implementations.

In some implementations, electronic device 100 may be provided in the form of a computer integrated into a computer monitor. Display 110 may be mounted on a front surface of housing 106 and a stand may be provided to support housing (e.g., on a desktop).

Figure 2:
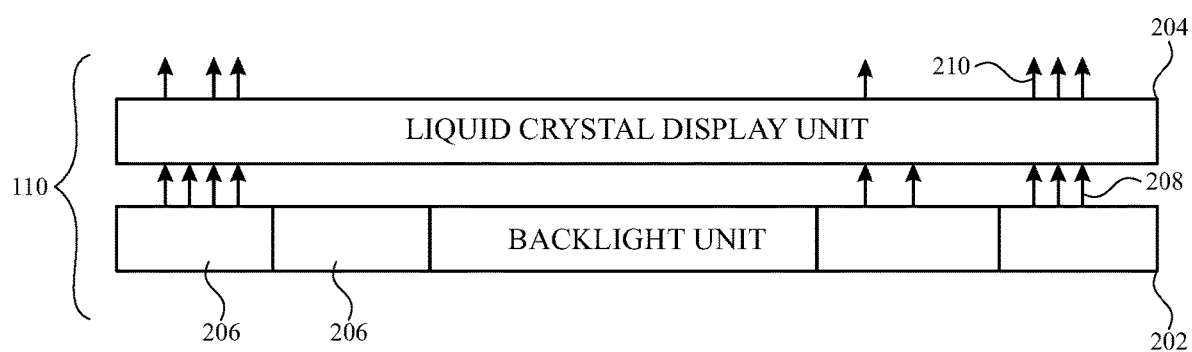
FIG. 2 illustrates a block diagram of a side view of an electronic device display having a backlight unit in accordance with various aspects of the subject technology.

FIG. 2 is a schematic diagram of display 110 showing how the display may be provided with a liquid crystal display unit 204 and a backlight unit 202. As shown in FIG. 2, backlight unit 202 generates backlight 208 and emits backlight 208 in the direction of liquid crystal display unit 204. Liquid crystal display unit 204 selectively allows some or all of the backlight 208 to pass through the liquid crystal display pixels therein to generate display light 210 visible to a user. Backlight unit may include one or more subsections 206. In some implementations, subsections 206 may be elongated subsections that extend horizontally or vertically across some or all of display 110 (e.g., in an edge-lit configuration for backlight unit 202). In other implementations, subsections 206 may be square or nearly square subsections (e.g., in a two-dimensional array backlight configuration). Accordingly, subsections 206 may be defined one or more strings of LEDs disposed in that subsection. Subsections 206 may be controlled individually for local dimming of backlight 208.

Figure 3:
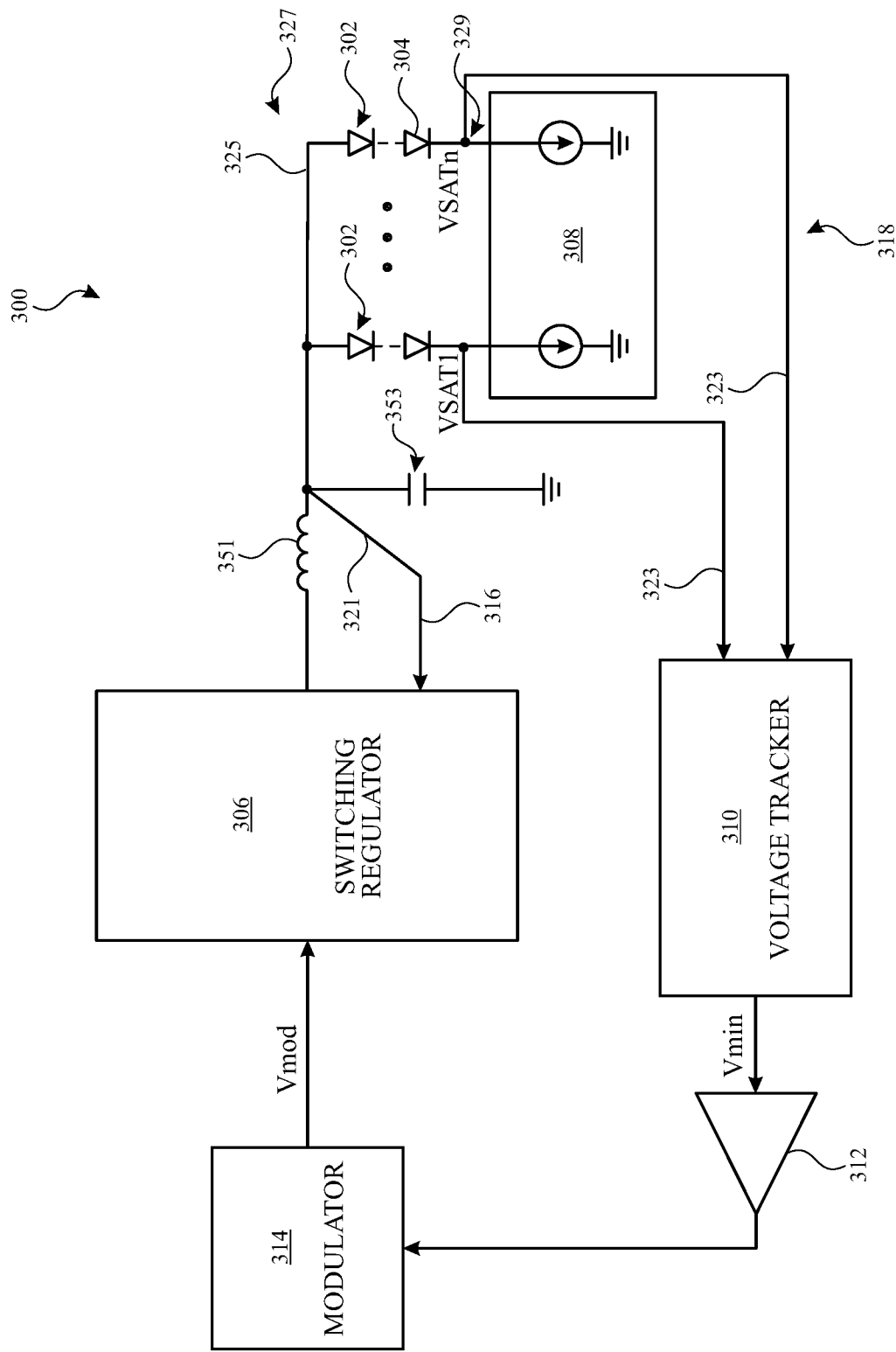
FIG. 3 illustrates a schematic view of backlight control circuitry including headroom control circuitry in accordance with various aspects of the subject technology.

FIG. 3 shows a schematic diagram of exemplary display circuitry including backlight control circuitry 300 that may be implemented in backlight unit 202. In the example of FIG. 3, backlight circuitry 300 includes multiple strings 302 of LEDs 304. Strings 302 each include multiple LEDs 304 in series. Strings 302 are coupled, in parallel, between a common supply voltage line and LED driver circuit 308. LED driver circuit 308 may individually control the current through each string 302 (e.g., for local dimming of one or more of strings 302 for dynamic backlight control).

Backlight control circuitry 300 includes a voltage supply circuit 306 which may be implemented with a switching regulator (e.g., a buck converter or a boost converter). In the example of FIG. 3, filtering components including inductor 351 (coupled between the output of switching regulator 306 and the first end of strings 302) and capacitor 353 (having a first terminal coupled to ground and a second terminal coupled between inductor 351 and the first end of strings 302) are provided that may be used in implementations in which switching regulator 306 is a buck converter. Various examples are described herein for buck converter implementations of switching regulator 306. However, it should be appreciated that switching regulator 306 can alternatively be implemented as a boost converter (with appropriate corresponding changes to filtering components 351 and 353).

Modulator 314 may provide a reference voltage or target voltage to switching regulator 306. In order to ensure that the output voltage of voltage supply circuit 306 is the target voltage, backlight control circuitry 300 includes a first feedback loop 316. First feedback loop 316 includes a sampling line 321 coupled to a supply voltage line 325 that runs between voltage supply circuit 306 and the first end 327 of LED strings 302. Sampling line 321 of first feedback loop 316 provides the supply voltage back to voltage supply circuit 306 for adjustment of the output voltage to match the target supply voltage.

To reduce headroom voltage to match a target headroom voltage, backlight control circuitry 300 may be provided with headroom control circuitry. In the example of FIG. 3, headroom control circuitry of backlight control circuitry 300 includes a second feedback loop 318 that includes voltage tracker 310, sampling lines 323 each coupled between voltage tracker 310 and a second end 329 of an associated string 302, an amplifier 312, and modulator 314. As shown in FIG. 3, each sampling line 323 may be coupled to the second end 329 of a corresponding LED string 304 at a location between the last LED 304 in the string (e.g., the LED closest to the LED driver circuit) and LED driver circuit 308. In this way, the sampling lines are arranged to provide a residual voltage on each string to voltage tracker 310. Voltage tracker 310 determines the minimum of the sampled residual voltages on each string 302.

In some implementations, voltage tracker 310 may include a sample-and-hold circuit for holding sampled voltages until voltage supply circuit 306 is ready for an updated target voltage. For example, in some operational scenarios, voltage tracker 310 may sample the residual voltage on each LED string at a sampling rate that is faster than the settling time of switching regulator 306. For example, voltage tracker 310 may discard and resample residual voltages until voltage supply circuit 306 is ready for an updated target voltage (e.g., when the output voltage of switching regulator 306 has reached or settled at a previous target voltage). For example, switching regulator 306 may have a setting time of fifty microseconds after a new target voltage is provided.

In some implementations, described in further detail hereinafter, voltage tracker 310 may perform other operations, such as comparison and/or scaling operations to generate a supply voltage modification to be used by modulator 314 to set the new target voltage for buck converter 306. As shown, the second feedback loop may include an amplifier 312 for converting the minimum detected voltage determined by voltage tracker 310, using the switching converter gain, to an appropriate value for modulator 314 to set the new target voltage for buck converter 306.

Figure 4:
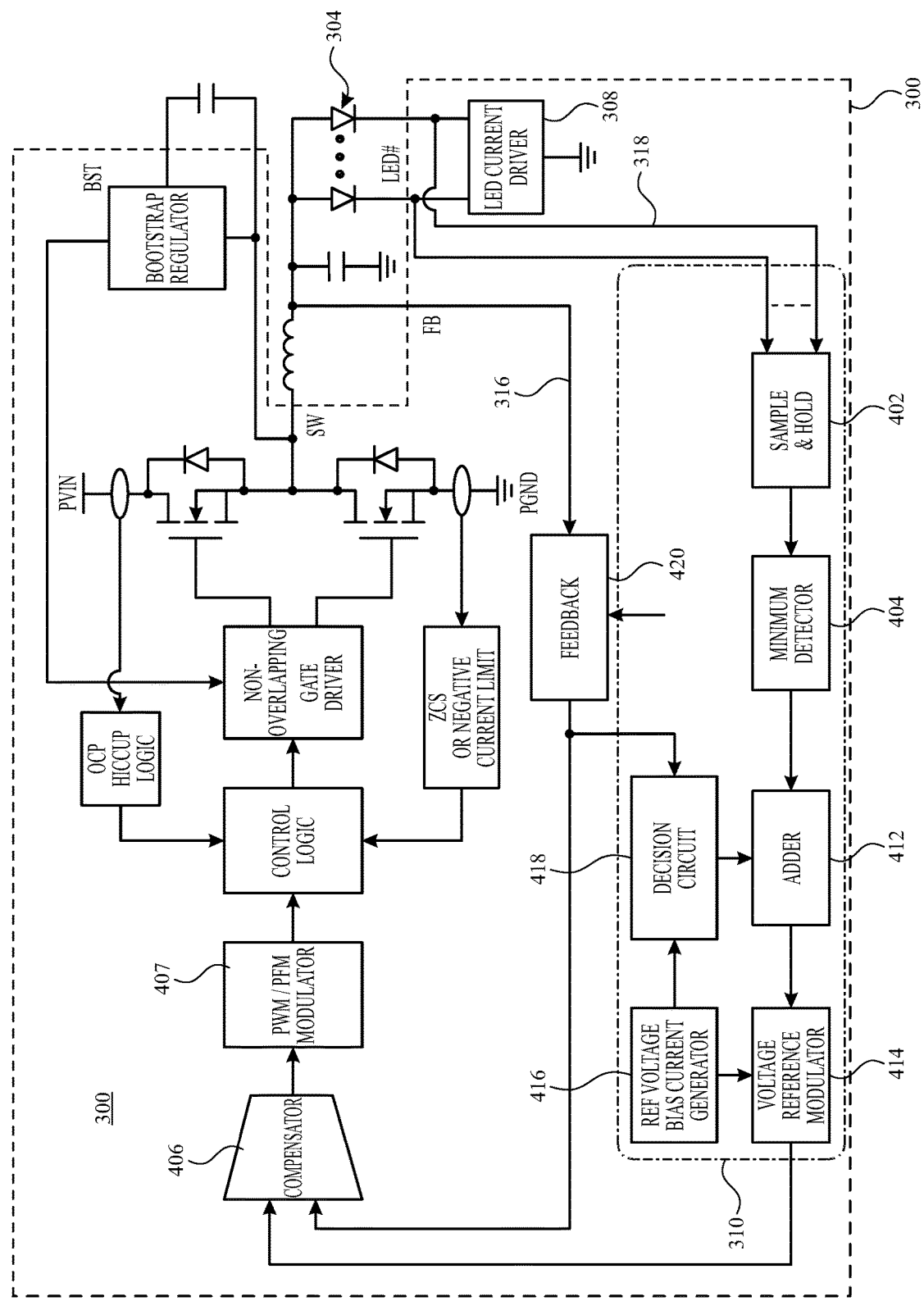
FIG. 4 illustrates another schematic view of backlight control circuitry including headroom control circuitry in accordance with various aspects of the subject technology.

FIG. 4 shows further details of backlight control circuitry 300 in one exemplary implementation. In particular, FIG. 4 shows an exemplary implementation of voltage tracker 310 having sample-and-hold circuit 402, a minimum detector 404, an adder (or subtracter) 412, a voltage reference modulator 414, a reference (REF) voltage bias current generator 416, and a decision circuit 418. As shown in FIG. 4, a feedback circuit 420 may provide a feedback voltage from sampling line 321 to both a compensator 406 for supply voltage generation and to a decision circuit 418. Decision circuit 418 may determine whether the voltage supply circuit 306 is ready for an updated target voltage based on the supplied feedback voltage. For example, decision circuit 418 may determine that the voltage supply circuit is ready for an updated target voltage when a measured accuracy of the supply voltage is within, for example, 2 percent. Feedback circuit 420 may optionally receive a synchronization signal in addition to the feedback voltage in some implementations.

In the example of FIG. 4, sampling lines 323 of second feedback loop 318 provide residual voltages from each string of LEDs 304 (note that in the example of FIG. 4, each string only includes one LED 304, though one or more LEDs 304 may be included in series in each string) to sample-and-hold circuit 402. Sample-and-hold circuit 402 may sample and hold the residual voltages during each cycle of a modulator 407 of the voltage supply circuit. As will be understood by one skilled in the art, switching converter 306 (e.g., using modulator 407) may control its output voltage in various modes such as a pulse-width-modulation (PWM) mode, or a pulse-frequency-modulation (PFM) mode in various scenarios. Minimum detector 404 determines a minimum of the sampled residual voltages (e.g., real-time or held residual voltages).

If it is determined by decision circuit 418 that voltage supply circuit 306 is ready for a new target voltage, adder 412 (e.g., a switched-capacitor-based adder) may determine a correction factor based on a comparison of the determined minimum voltage with a target headroom voltage. For example, adder 412 may subtract a target headroom voltage from the detected minimum voltage and divide the difference by a switching-converter gain factor to determine the correction factor. Voltage reference modulator 414 may apply the correction factor to a previous target voltage (e.g., by subtracting the correction factor from the previous target voltage) and provide a new target voltage to compensator 406. The new target voltage may be scaled for the switching converter by multiplying the difference of the previous target voltage and the correction factor by the switching-converter gain factor. The target voltage may be used as a reference voltage for comparison, by compensator 406, with the supply voltage sampled by feedback loop 316.

As shown, compensator 406 receives a feedback signal from both feedback loop 316 (e.g., the sampled output voltage of the voltage supply circuit) and feedback loop 318 (e.g., a new target voltage) and provides adjustments for modifying the output voltage of the switching regulator to match the new target voltage (e.g., by modifying the PWM or PFM operation of modulator 407 and/or by changing the operating mode of modulator 407).

For example, while operating in any operating mode, when a new, higher, target voltage is provided by voltage reference modulator 414, switching regulator 306 may increase the supply voltage provided to LED strings 302. As another example, while operating in a PWM operating mode, when a new, lower, target voltage is provided by voltage reference modulator 414, switching regulator 306 may decrease the supply voltage provided to LED strings 302 by decreasing the PWM duty cycle. As another example, while operating in a non-PWM operating mode (e.g., a PFM mode), when a new, lower, target voltage is provided by voltage reference modulator 414, switching regulator 306 may take no action (allowing a brief interval of excess headroom voltage), may change the frequency of PFM pulses, or may decrease the supply voltage provided to LED strings 302 by switching to a PWM mode and setting the PWM duty cycle to provide the reduced voltage. Compensator 406 and modulator 407 may form a portion of the switching regulator of FIG. 3. Various additional components of backlight control circuitry 300 (e.g., control logic, overcurrent protection (OCP) hiccup logic, a non-overlapping gate driver, a bootstrap regulator, and a zero-current switch (ZCS) or negative current limit circuit of the switching regulator) are shown in FIG. 4, the function of which will be understood by one skilled in the art as shown.

Figure 5:
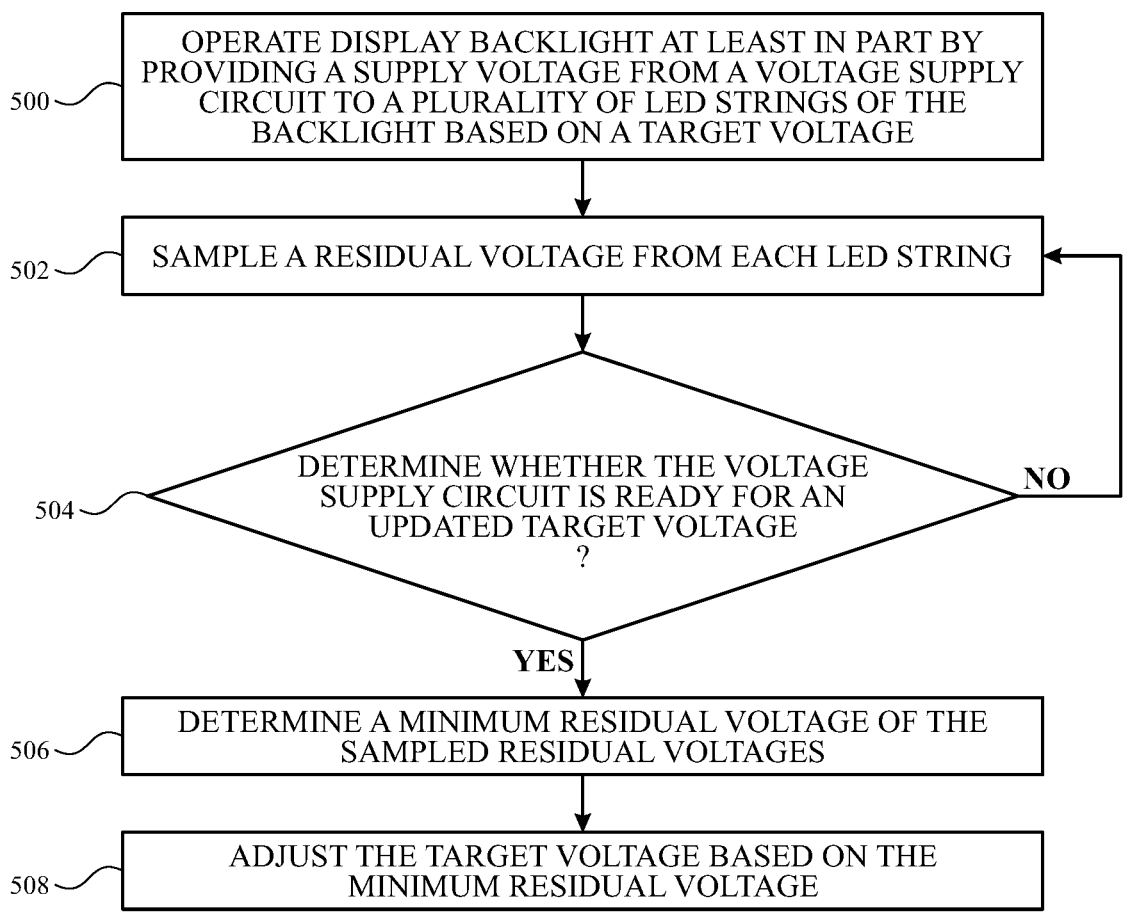
FIG. 5 illustrates a flow chart of an example process for dynamic headroom control in accordance with various aspects of the subject technology.

FIG. 5 depicts a flow diagram of an example process for headroom voltage reduction for electronic device displays in accordance with various aspects of the subject technology. For explanatory purposes, the example process of FIG. 5 is described herein with reference to the components of FIGS. 1-4. Further for explanatory purposes, the blocks of the example process of FIG. 5 are described herein as occurring in series, or linearly. However, multiple blocks of the example process of FIG. 5 may occur in parallel. In addition, the blocks of the example process of FIG. 5 need not be performed in the order shown and/or one or more of the blocks of the example process of FIG. 5 need not be performed.

In the depicted example flow diagram, at block 500, an LED component such as a display backlight (e.g., backlight unit 202) is operated, at least in part, by providing a supply voltage from a voltage supply circuit (e.g., switching regulator 306 of backlight control circuitry 300) to a plurality of LED strings (e.g., strings 302) of the backlight based on a target voltage. The supply voltage may be a common supply voltage provided to a first end of all of the LED strings. Providing the supply voltage may include operating a switching converter (e.g., a buck converter or a boost converter) in one of various modes of operation (e.g., a PWM mode or a PFM mode).

At block 502, a residual voltage may be sampled from each LED string. The residual voltage may be sampled at an opposing second end of each of the LED strings by headroom control circuitry that includes a feedback loop (e.g., second feedback loop 318). In some implementations, the sampled residual voltages may optionally be held by a sample-and-hold circuit (e.g., sample-and-hold circuit 402) for each of several sampling cycles at a particular target voltage, such as for each cycle of a pulse-width-modulation signal, in a PWM mode for the switching converter. A sample-and-hold circuit may be provided if a settling time, for the switching converter to achieve a new target voltage, is similar to or longer than a sampling time for sampling the residual voltages. In such an implementation, although a new set of residual voltages may be sampled at various times while the switching converter is attempting to achieve a particular target voltage, the switching converter may not be ready for an update at the time of each sample.

At block 504, the headroom control circuitry may optionally determine whether the voltage supply circuit is ready for an updated target voltage. Determining whether the voltage supply circuit is ready for an updated target voltage may include determining whether the output of the buck converter has settled at a previous target voltage (e.g., to within two percent) using a first feedback loop (e.g., feedback loop 316) that samples the current supply voltage.

If it is determined that the switching converter is not ready for an update, the headroom control circuitry may return to block 502 and sample the residual voltages on the strings again.

At block 506, if it is determined that the voltage supply circuit is ready for an updated target voltage, a minimum residual voltage of the sampled (and held) residual voltages may be determined.

At block 508, the target voltage for the voltage supply circuit may be adjusted (modified) based on the minimum residual voltage. Adjusting the target voltage may include comparing the determined minimum voltage to a target headroom voltage and generating the new target voltage for the common supply voltage based on the comparison of the determined minimum to the target headroom voltage. The switching converter may then adjust its output voltage to achieve the new target voltage (e.g., the switching converter may change an operating mode, change a duty cycle of a pulse-width modulation signal, and/or adjust the frequency of pulses in a PFM signal, based on the new target voltage).

In accordance with various aspects of the subject disclosure, an electronic device having a display is provided, the display including a backlight unit having a plurality of light-emitting diodes. The display also includes backlight control circuitry. The backlight control circuitry includes a voltage supply circuit configured to provide a common supply voltage to the plurality of light-emitting diodes and headroom control circuitry. The headroom control circuitry is configured to sample a residual voltage for each of at least two of the light-emitting diodes, determine a minimum of the residual voltages, and provide a supply voltage modification to the voltage supply circuit based on the determined minimum of the residual voltages.

In accordance with other aspects of the subject disclosure, the plurality of light-emitting diodes includes a plurality of strings of light-emitting diodes each having a first end, an opposing second end, and more than one light-emitting diode coupled in series between the first end and the second end.

In accordance with other aspects of the subject disclosure, the voltage supply circuit is configured to provide the common supply voltage to the first ends of each of the strings of light-emitting diodes.

In accordance with other aspects of the subject disclosure, the headroom control circuitry includes a feedback loop having a plurality of sampling lines, each coupled to the second end of an associated one of the strings of light-emitting diodes.

In accordance with other aspects of the subject disclosure, the headroom control circuitry further includes a voltage tracker coupled to each of the sampling lines and configured to receive the sampled residual voltages and determine the minimum of the residual voltages.

In accordance with other aspects of the subject disclosure, the voltage tracker further includes a sample-and-hold circuit configured to sample and hold the residual voltages during each of a plurality of pulse-width modulation cycles of the voltage supply circuit.

In accordance with other aspects of the subject disclosure, the sample-and-hold circuitry is further configured to provide a held set of residual voltages in the sample-and-hold circuitry to a minimum detector when the voltage supply circuit is ready to provide a new common supply voltage based on a new target supply voltage.

In accordance with other aspects of the subject disclosure, the backlight control circuitry also includes an additional feedback loop including a sampling line configured to provide an output voltage of the voltage supply circuit back to the voltage supply circuit.

In accordance with other aspects of the subject disclosure, the backlight control circuitry further includes a current driver and each of the sampling lines is coupled to the second end of the associated one of the strings of light-emitting diodes at a location between the current driver and a last light-emitting diode in that string.

In accordance with other aspects of the subject disclosure, the voltage supply circuit includes a buck converter.

In accordance with other aspects of the subject disclosure, the voltage supply circuit further includes a modulation circuit configured to pulse-width modulate an output of the buck converter to generate a target voltage as the common supply voltage.

In accordance with other aspects of the subject disclosure, the supply voltage modification from the headroom control circuitry includes a new target voltage, and the modulation circuit is configured to change a duty cycle of the pulse-width-modulated output of the buck converter to adjust the common supply voltage to the new target voltage.

In accordance with other aspects of the subject disclosure, a method of operating an electronic device is provided that includes providing a common supply voltage from a buck converter to a plurality of light-emitting diode strings coupled in parallel between the buck converter and a current driver. The method also includes sampling a residual voltage from each of the plurality of light-emitting diode strings. The method also includes determining a minimum of the residual voltages. The method also includes modifying the common supply voltage based on the determined minimum.

In accordance with other aspects of the subject disclosure, providing the common supply voltage includes providing a pulse-width modulation signal having a duty cycle within the buck converter, and modifying the common supply voltage includes modifying the duty cycle.

In accordance with other aspects of the subject disclosure, sampling the residual voltage from each of the plurality of light-emitting diode strings includes sampling the residual voltage from each of the plurality of light-emitting diode strings for each cycle of the pulse-width modulation signal.

In accordance with other aspects of the subject disclosure, the method also includes holding the sampled residual voltages during a current cycle of the pulse-width modulation signal using a sample-and-hold circuit, and determining the minimum of the residual voltages includes determining the minimum of the held sampled residual voltages.

In accordance with other aspects of the subject disclosure, the method also includes, prior to holding the sampled residual voltages during the current cycle of the pulse-width modulation signal, sampling and holding another residual voltage from each of the plurality of light-emitting diode strings during a previous cycle of the pulse-width modulation signal, determining that the buck converter has not yet reached a previous target voltage, and discarding the held residual voltages from the previous cycle of the pulse-width modulation signal.

In accordance with other aspects of the subject disclosure, modifying the common supply voltage based on the determined minimum includes comparing the determined minimum to a target headroom voltage, generating a new target voltage for the common supply voltage based on the comparison of the determined minimum to the target headroom voltage, and modifying an output voltage of the buck converter based on the new target voltage.

In accordance with other aspects of the subject disclosure, an electronic device with a display is provided, the display including a plurality of strings of light-emitting diodes, each string including a plurality of light-emitting diodes coupled in series between a first end and a second end of that string. The display also includes a buck converter configured to provide a common supply voltage to the first ends of all of the strings. The display also includes a first feedback loop to match the common supply voltage to a target supply voltage. The display also includes a second feedback loop to sample a residual voltage at the second end of each of the strings and modify the target supply voltage based on a difference between a minimum one of the residual voltages and a target headroom voltage.

In accordance with other aspects of the subject disclosure, the first feedback loop includes a sampling line coupled to a common voltage supply line for the plurality of strings.

In accordance with other aspects of the subject disclosure, the display also includes current driver circuitry coupled to each of the strings at the second end. The second feedback loop includes a plurality of additional sampling lines, each coupled to a corresponding one of the strings between the current driver circuitry and a last light-emitting diode in that string.

In accordance with other aspects of the subject disclosure, the display also includes a modulator configured to provide a pulse-width-modulated output or a pulse-frequency-modulated output from the buck converter.

In accordance with other aspects of the subject disclosure, the modulator is configured to modify a duty cycle of the pulse-width-modulated output based on the modified target supply voltage.

In accordance with other aspects of the subject disclosure, the second feedback loop comprises a sample-and-hold circuit to sample and hold the residual voltage at the second end of each of the strings for each cycle of the pulse-width-modulated output.

In accordance with other aspects of the subject disclosure, the modulator is configured to modify a mode of operation of the buck converter based on the modified target supply voltage Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic device having a display, the display comprising:
    a backlight unit having a plurality of light-emitting diodes; and
    backlight control circuitry, comprising:
        a voltage supply circuit configured to provide a common supply voltage to the plurality of light-emitting diodes; and
        headroom control circuitry configured to:
            sample a residual voltage for each of at least two of the light-emitting diodes;
            determine a minimum of the residual voltages; and
            provide a supply voltage modification to the voltage supply circuit based on the determined minimum of the residual voltages.

2. The electronic device of claim 1, wherein the plurality of light-emitting diodes comprises a plurality of strings of light-emitting diodes each having a first end, an opposing second end, and more than one light-emitting diode coupled in series between the first end and the second end.

3. The electronic device of claim 2, wherein the voltage supply circuit is configured to provide the common supply voltage to the first ends of each of the strings of light-emitting diodes.

4. The electronic device of claim 3, wherein the headroom control circuitry comprises a feedback loop having a plurality of sampling lines, each coupled to the second end of an associated one of the strings of light-emitting diodes.

5. The electronic device of claim 4, wherein the headroom control circuitry further comprises a voltage tracker coupled to each of the sampling lines and configured to receive the sampled residual voltages and determine the minimum of the residual voltages.

6. The electronic device of claim 5, wherein the voltage tracker further comprises a sample-and-hold circuit configured to sample and hold the residual voltages during each of a plurality of pulse-width modulation cycles of the voltage supply circuit.

7. The electronic device of claim 6, wherein the sample-and-hold circuit is further configured to provide a held set of residual voltages in the sample-and-hold circuit to a minimum detector when the voltage supply circuit is ready to provide a new common supply voltage based on a new target supply voltage.

8. The electronic device of claim 4, the backlight control circuitry further comprising an additional feedback loop comprising a sampling line configured to provide an output voltage of the voltage supply circuit back to the voltage supply circuit.

9. The electronic device of claim 8, the backlight control circuitry further comprising a current driver, wherein each of the sampling lines is coupled to the second end of the associated one of the strings of light-emitting diodes at a location between the current driver and a last light-emitting diode in that string.

10. The electronic device of claim 1, wherein the voltage supply circuit comprises a boost converter.

11. The electronic device of claim 1, wherein the voltage supply circuit comprises a buck converter.

12. The electronic device of claim 11, wherein the voltage supply circuit further comprises a modulation circuit configured to pulse-width modulate an output of the buck converter to generate a target voltage as the common supply voltage.

13. The electronic device of claim 12, wherein the supply voltage modification from the headroom control circuitry comprises a new target voltage, and wherein the modulation circuit is configured to change a duty cycle of the pulse-width-modulated output of the buck converter to adjust the common supply voltage to the new target voltage.

14. A method of operating an electronic device, the method comprising:
    providing a common supply voltage from a buck converter to a plurality of light-emitting diode strings coupled in parallel between the buck converter and a current driver;
    sampling a residual voltage from each of the plurality of light-emitting diode strings;
    determining a minimum of the residual voltages; and
    modifying the common supply voltage based on the determined minimum.

15. The method of claim 14, wherein providing the common supply voltage comprises providing a pulse-width modulation signal having a duty cycle within the buck converter, and wherein modifying the common supply voltage comprises modifying the duty cycle.

16. The method of claim 15, wherein sampling the residual voltage from each of the plurality of light-emitting diode strings comprises sampling the residual voltage from each of the plurality of light-emitting diode strings for each cycle of the pulse-width modulation signal.

17. The method of claim 16, further comprising holding the sampled residual voltages during a current cycle of the pulse-width modulation signal using a sample-and-hold circuit, and wherein determining the minimum of the residual voltages comprises determining the minimum of the held sampled residual voltages.

18. The method of claim 17, further comprising, prior to holding the sampled residual voltages during the current cycle of the pulse-width modulation signal:
    sampling and holding another residual voltage from each of the plurality of light-emitting diode strings during a previous cycle of the pulse-width modulation signal;
    determining that the buck converter has not yet reached a previous target voltage; and
    discarding the held residual voltages from the previous cycle of the pulse-width modulation signal.

19. The method of claim 14, wherein modifying the common supply voltage based on the determined minimum comprises:
    comparing the determined minimum to a target headroom voltage;
    generating a new target voltage for the common supply voltage based on the comparison of the determined minimum to the target headroom voltage; and
    modifying an output voltage of the buck converter based on the new target voltage.

20. An electronic device with a display, the display comprising:
- a plurality of strings of light-emitting diodes, each string including a plurality of light-emitting diodes coupled in series between a first end and a second end of that string;
- a buck converter configured to provide a common supply voltage to the first ends of all of the strings;
- a first feedback loop to match the common supply voltage to a target supply voltage; and
- a second feedback loop to sample a residual voltage at the second end of each of the strings and modify the target supply voltage based on a difference between a minimum one of the residual voltages and a target headroom voltage.

21. The electronic device of claim 20, wherein the first feedback loop comprises a sampling line coupled to a common voltage supply line for the plurality of strings.

22. The electronic device of claim 21, the display further comprising current driver circuitry coupled to each of the strings at the second end, wherein the second feedback loop comprises a plurality of additional sampling lines, each coupled to a corresponding one of the strings between the current driver circuitry and a last light-emitting diode in that string.

23. The electronic device of claim 20, the display further comprising a modulator configured to provide a pulse-width-modulated output or a pulse-frequency-modulated output from the buck converter.

24. The electronic device of claim 23, wherein the modulator is configured to modify a duty cycle of the pulse-width-modulated output based on the modified target supply voltage.

25. The electronic device of claim 23, wherein the second feedback loop comprises a sample-and-hold circuit to sample and hold the residual voltage at the second end of each of the strings for each cycle of the pulse-width-modulated output.

26. The electronic device of claim 23, wherein the modulator is configured to modify a mode of operation of the buck converter based on the modified target supply voltage.

* * * * *